Rudolf Becker
Ernst Karwat
INVENTORS.

BY Karl G. Ross
AGENT.

Rudolf Becker
Ernst Karwat
INVENTORS.

BY Karl G. Ross
AGENT

United States Patent Office 3,407,146
Patented Oct. 22, 1968

3,407,146
PROCESS FOR THE RECOVERY OF HYDROGEN-NITROGEN MIXTURES WITH REDUCED CARBON-MONOXIDE CONTENT
Rudolf Becker, Munich-Solln, and Ernst Karwat, Pullach, Isartal, Germany, assignors to Linde Aktiengesellschaft, a corporation of Germany
Filed Jan. 21, 1965, Ser. No. 427,068
Claims priority, application Germany, Jan. 22, 1964, G 39,669
9 Claims. (Cl. 252—377)

ABSTRACT OF THE DISCLOSURE

A crude gas containing hydrogen, nitrogen and carbon monoxide is separated in a fractionating column to produce an overhead hydrogen-nitrogen gas of varying relative proportions. The relative hydrogen-nitrogen make-up of the overhead gas is controlled by adding nitrogen to the crude gas prior to fractionation in sufficient quantities such that the percent of hydrogen in the crude gas plotted against the carbon-monoxide impurity ratio falls within a predetermined area of FIGURE 1.

---

The present invention relates to an improved process for the recovery of hydrogen-nitrogen mixtures, having a reduced proportion of carbon monoxide, from crude hydrogen-containing streams having a relatively high proportion of this oxide.

It is a common problem in the use of hydrogen streams containing nitrogen for synthesis (e.g. of ammonia or compounds of the ammonia family) and hydrogenation to provide a gas stream consisting predominantly of hydrogen and also relatively large proportions of nitrogen, with a reduced content of carbon monoxide. Thus, it is desirable for the purposes of hydrogenation to use a hydrogen stream whose purity is between substantially 98 and 98.6% (percent hydrogen by volume) and in which the carbon-monoxide content does not exceed substantially 0.2% by volume. The carbon-monoxide content of hydrogen-nitrogen mixtures for ammonia synthesis should not exceed 5 parts per million (p.p.m.) of the reaction gas. It is, however, difficult, if not impossible, to obtain economically such purities and carbon-monoxide levels of such low degree by conventional methods of purifying crude hydrogen-containing gases. The crude hydrogen-containing gases of the present invention and those used heretofore as a source of hydrogen for the purposes indicated are generally formed either by chemical transformation (i.e. cracking, reformation, partial combustion) of solid, liquid or gaseous fuels (combustibles such as hydrocarbons) or by physical separation from hydrogen-containing mixtures, the product being subjected, if necessary, to pressure treatments, cooling, partial liquification or adsorption to yield a gas stream consisting predominantly of hydrogen and containing, as impurities, nitrogen ($N_2$), carbon monovide (CO), methane ($CH_4$) and oxygen ($O_2$).

Thus, it has been proposed to subject the crude hydrogen-containing gas to an elevated pressure at relatively low temperatures in order to effect at least partial condensation of the principal impurities mentioned above. For example, at a pressure of about 16 atmospheres and a temperature of 65° K., partial condensation of impurities can be carried out to reduce the overall impurity level to approximately 1.5–2%. Under these conditions, oxygen and methane are substantially completely precipitated out and eliminated. The elimination of carbon monoxide and nitrogen, however, by such partial condensation is not possible, nor is it a simple matter to remove one of these compounds to the exclusion of the other only by partial-condensation (fractional-condensation) techniques. When carbon monoxide and nitrogen are present originally in the hydrogen-containing gas in substantially equal quantities, partial or fractional condensation eliminates as much carbon monoxide as nitrogen in an equilibrium-type separation. It is immaterial in this connection, whether the partial condensation is effected by countercurrent heat exchange between the gas and liquid, by direct heat transfer or precipitation with the liquid and gas moving in the same direction, or by any other conventional manner of eliminating the liquid from the gas. It has thus been necessary to resort to other techniques when a hydrogen-nitrogen gas mixture with a reduced carbon-monoxide content is desired. These other techniques include the washing, rinsing or sparging of a carbon-monoxide-containing crude hydrogen-containing gas stream with pure liquid nitrogen. This technique is particularly satisfactory when the purified gas mixture is to be employed for synthesis of ammonia. A rinsing liquid, i.e. relatively pure nitrogen, has also been employed for the preparation of hydrogenation gases when the carbon-monoxide content must be reduced to a maximum of 0.2% in the hydrogen-containing gas. The rinsing or washing can be carried out in conventional washing towers in which case the product at the head of the tower, herein referred to as the head product, contains a large proportion of nitrogen, e.g. between substantially 5 and 13% by volume, as a consequence of the hydrogen presure and the partial pressure of nitrogen in the washing liquid. This increase in the nitrogen content of the hydrogen gas may be disadvantageous in hydrogenation processes and so the gas, after washing, may be subjected to removal of nitrogen, by fractional condensation, until its content thereof is reduced to between substantially 1.5 and 2%. The principal disadvantage of both of these techniques resides in the need for an air-rectification installation for the production of nitrogen at a purity sufficient to enable it to be used as a flushing or washing liquid.

It is the principal object of the present invention to provide a method of recovering nitrogen-containing hydrogen gas streams with low carbon-monoxide contents in an economical manner whereby the generation of large quantities of high-purity nitrogen rinsing liquids, in a separate rectification installation or the like, can be avoided.

It is another object of the present invention to provide an improved method of and means for the high-rate and economical purification of hydrogen-containing gases in such manner as to enable them to be used for hydrogenation and ammonia synthesis.

The foregoing and additional objects of the invention, which will become apparent hereinafter, are attained by avoiding the washing of the hydrogen-containing gas with pure nitrogen from an air-rectification installation and, instead, submitting the crude-gas stream, just prior to partial condensation by cooling at an elevated pressure, to a multi-stage reflux washing with the condensate derived from the vapors of the rectification process by subjecting them to partial condensation and thereby serving as the return or refluxing liquid for the separation process. The crude-gas stream is thus separated into a liquid carbon monoxide/nitrogen fraction and a gaseous nitrogen/hydrogen fraction of reduced carbon-monoxide content.

Thus, while known systems for producing hydrogen-containing gases having low carbon-monoxide contents require an extraneous source of substantial quantities of liquid nitrogen as the washing medium, in the system of the present invention the washing liquid is formed by partial condensation from the gases rising within a washing and rectification tower at a deep-cooling stage which preferably is the last stage of the system. To the extent that a low carbon-monoxide content appears in the gas at the head of the rectification tower prior to the condensation stage, the carbon-monoxide concentration will be low in the liquid nitrogen stream produced by the condensation and serving as reflux liquid for washing of the crude gas. At low carbon-monoxide concentrations, the reflux liquid is highly efficient in removing carbon monoxide from the crude-gas stream in accordance with the corresponding distribution relationship. Since extremely low carbon-monoxide concentrations are originally present in the condensate, the washing liquid constituted thereby is equivalent to pure nitrogen. Since the carbon-monoxide concentration increases as the liquid descends or when higher concentrations are initially present, however, additional washing and rectification stages will be necessary to obtain the same degree of elimination of carbon monoxide from the crude-gas stream. The stages can be constituted by the usual fractional rectification or condensation stages of a washing, condensation or rectifying tower and can include stacked imperforate or perforate plates which preferably form a tortuous path.

Because of the distribution relationship, i.e. the equation determining partition of carbon monoxide between the crude gas and the reflux washing liquid, the carbon monoxide content of the gas stream rich in hydrogen and constituting the product whose recovery is desired, it is related to the quantity of refluxing liquid available and its carbon-monoxide content. Accordingly, with few rectification and refluxing stages, a content of, for example, 0.1% carbon monoxide can be obtained in the hydrogen containing product while, when a large number of stages or stacked plates are employed, the concentration of carbon monoxide can be reduced to about 5 cm.$^3$ per m.$^3$ of hydrogen-nitrogen mixtures (S.T.P.). The content of nitrogen in the product is dependent only upon the pressure and temperature of the last cooling stage at the head of the tower. When the gas is to be used for hydrogenation and a low nitrogen content is desirable, a temperature of 64° K. or lower, and a pressure of 20 atmospheres or higher at the head will yield a nitrogen content of at most 1.8%, by volume, in the product. When, however, a nitrogen concentration in a 1:3 relationship with hydrogen is desired for ammonia synthesis, a pressure of about 8 atmospheres and a temperature of about 83.5° K. are employed at the head of the rectification tower. These operating conditions are preferred for the purposes of the present invention.

It has been discovered, however, that not all gas mixtures of hydrogen, nitrogen and carbon monoxide permit of purification in the manner described. In some cases, when the product is subjected to rectification and reflux separation, in spite of a large number of rectification stages, the gas mixture emerges from the head of the tower with considerably more carbon monoxide than is permissible for the indicated purposes and frequently unaltered by the washing steps. It has been observed that such a failure is due to the composition of the gas mixture to be separated. More specifically, it has been observed that, when an ammonia-synthesis gas containing hydrogen and nitrogen in a 3:1 volume ratio is desired, it is necessary to operate with a crude gas defined by the curve A and the area thereunder of FIG. 1 in which the proportion of hydrogen in the crude gas is plotted along the ordinate against the carbon-monoxide impurity level along the abscissa. In general, the composition of the crude gas should lie within the area beneath the graph B, which represents the crude-gas composition necessary to yield a gaseous product containing at most 0.2% carbon monoxide. Graph A represents the crude gas composition necessary to yield a product substantially free from carbon monoxide and containing approximately 75%, by volume, hydrogen and 25%, by volume, nitrogen. As the carbon monoxide impurity ratio, i.e. the ratio in percent by volume of carbon monoxide to the total volume of carbon monoxide and nitrogen, falls, the more economical is the process of the present invention. Therefore, the hydrogen content of a crude gas must not exceed 33% when the carbon-monoxide impurity ratio thereof is 10% and the head product gas is to be employed in ammonia synthesis. When the carbon-monoxide impurity level is, however, 5%, the gas can have a hydrogen content of up to 42%. Graph B applies when the product is to have 90% hydrogen and 10% nitrogen. In this case a CO-impurity ratio permits the use of a gas containing 68% $H_2$.

When the carbon-monoxide impurity ratio exceeds the limits established by the graphs A and B for the respective purposes, it is proposed, according to a further feature of the invention, to increase the nitrogen concentrations until the impurity level comes again within the curves. While pure nitrogen can be employed for this purpose, it has been found economical and technologically advantageous to add a gas rich in nitrogen, namely air. When air is admixed with the crude gas, however, it is necessary that care be taken to ensure that the proportion of oxygen in the condensate recovered at the sump of the tower be below the explosion or detonation limit as established by the quantities of carbon monoxide, nitrogen and hydrogen also present. Instead of pure nitrogen or air, gas streams particularly rich in nitrogen but also containing some carbon dioxide (e.g. NO-free furnace exhaust gases) can be employed. The carbon dioxide is driven out of the gas either during the washing process or prior to its admixture with the crude gas.

When it is desired to produce a synthesis gas rich in nitrogen, i.e. having a ratio of hydrogen to nitrogen of 3:1, care must be taken to insure that sufficient nitrogen is present both for the precipitation or condensation and to constitute the residual nitrogen in the gas to be recovered. If the crude gas has a nitrogen content which is only equivalent to that amount which is necessary for constituting a ratio of hydrogen to nitrogen of 3:1, it is necessary to add further quantities of nitrogen which serve as a washing agent for the carbon monoxide. In these cases, the need for an independent nitrogen source can also be obviated by the present invention which provides that all or part of the carbon monoxide/nitrogen mixture from the sump of the tower can be vaporized at an atmospheric pressure or higher, whence the carbon monoxide can, by reaction with steam (water vapor) be reformed to hydrogen and carbon dioxide. The carbon dioxide can then be removed and the remaining mixture of hydrogen and nitrogen recombined with the crude-gas stream. The nitrogen thus extracted as the sump liquid can be recirculated in this manner and need not be provided from some extraneous source. The present invention can make use of a mixture having very relatively low concentrations of hydrogen as will become apparent hereinafter with reference to FIG. 1.

According to still another feature of the present invention, the carbon-monoxide content of the refluxing liquid can be raised and its nitrogen content lowered when the refluxing system includes, in addition to the condenser at its head, one or more vaporization units at the bottom of the tower, preferably between the inlet for the crude gas and the sump. The heating means can, in this case, be compressed nitrogen or the sump fluid which, by cooling in the tube-bundle between the sump and the inlet, is liquefied, and serves as the cooling fluid at the head of the tower. Additional liquid nitrogen can, for example, be supplied to the condenser in order to cover the cold demand. The higher the heat at the base of the tower, the greater will be the nitrogen eliminated with the gaseous product and the higher will be the carbon monoxide concentration of the sump liquid.

It has hitherto been required that the stoichiometric nitrogen content necessary for ammonia synthesis be present in the crude hydrogen gas. This alternative necessitates that chemical method of purification be employed since excessive rectification with liquid nitrogen and subsequent deep cooling eliminates this component from the mixture.

As indicated earlier, however, the system of the present invention permits selection of the ratio of hydrogen to nitrogen while insuring low carbon-monoxide content provided the conditions described with reference to FIG. 1 apply. Large quantities of nitrogen can be added to the mixture even though low concentrations of nitrogen are required in the final product. It is only necessary to provide that the nitrogen quantity in the crude gas be at least as high as is necessary in the product. Thus it is well to operate with nitrogen concentration of 1.5% nitrogen and upwards. It is, however, advantageous to have available excess nitrogen which can be used for washing carbon monoxide from the gas mixture by the refluxing system. There is for the first time the possibility to make use of crude gases rich in nitrogen as starting mixtures for ammonia synthesis, such as mine-gas, a mixture of methane and air, the methane making up between 35 and 95% of the mixture. Under these conditions, a saving of 60–70% of the cost of the input or crude gases can be obtained.

Furthermore the process according to the invention allows the replacement of oxygen by air in the production of the starting hydrogen mixture. So the costs of an oxygen plant can be saved. Instead of the expensive process of the catalytical cracking of natural gas with steam, it is now possible to make use of the less expensive autothermal process of catalytical partial combustion of natural gas with air in the production of ammonia.

The above and other objects, features and advantages of the present invention will become more readily apparent from the following description and specific examples, reference being made to the accompanying drawing in which.

Figure 1:
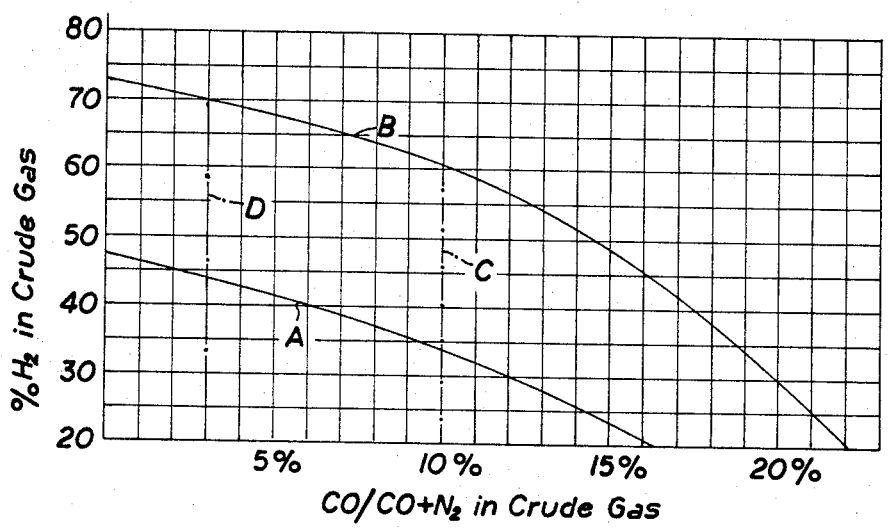
FIG. 1 is a graph showing crude-gas mixtures with which the present invention is operable.

In FIG. 1, there is shown a graph in which the crude gases suitable for the practice of the present invention are defined in terms of their composition. Along the ordinate there is plotted the volume percent of hydrogen in the crude gas, whereas the carbon-monoxide impurity ratio of the crude gas is plotted along the abscissa. For the purposes of the present invention the carbon-monoxide impurity ratio will be defined in terms of the volume ratio of carbon monoxide to the carbon monoxide and nitrogen contents of the crude gas. This ratio, rendered in percent, can be represented as:

$$\frac{CO}{CO+N_2}$$

For the purposes of the present invention, a suitable crude gas should have a composition falling within the area below the curve B to give rise to a purified gas stream having less than 0.2% carbon monoxide; synthesis gases for the production of ammonia lie within the area below the curve A to afford the necessary $H_2/N_2$ volume ratio of 3:1. When it is desired to produce an ammonia-synthesis gas with a composition within the area above curve A or to obtain a low carbon-monoxide level in a high-purity hydrogen gas of a composition in the region above curve B, it is necessary to add nitrogen to the crude gas to bring it to a level below the respective curve.

Thus if it is desirable to produce a gas having a low carbon-monoxide level (below approximately 0.2%) from a gas containing 70% hydrogen, the carbon monoxide impurity level cannot exceed about 3% (as shown by the dot-dash line D). In the event that the carbon-monoxide impurity level is higher than this value, it is necessary to add nitrogen to restore it to some level within the curve B. By way of example of the operation of such a system, it should be noted that a gas consisting of substantially 60% hydrogen, 4% carbon monoxide and 36% nitrogen (all by volume) will have a carbon-monoxide impurity level corresponding to that shown by the dot-dash line C. Since the hydrogen concentration is less than 61%, the crude gas can be purified by the present method to yield a greatly reduced carbon-monoxide level. When, however, the carbon-monoxide level exceeds that bounded by the curve B, addition of nitrogen is required; when, therefore, the hydrogen content of the mixture is 65% and the carbon-monoxide impurity level is 10% (e.g. when the carbon-monoxide content is 3.5% and the nitrogen content is 31.5%) it is necessary to reduce the carbon-monoxide impurity level to about 7% by addition of nitrogen. At a concentration of 3.5% carbon monoxide, the nitrogen content must be 46.5% if the carbon-monoxide impurity level is to be 7%. Addition of an equivalent quantity of nitrogen to yield this result would bring the mixture within the graphs A and B. It should be understood, however, that a mere dilution of the crude-gas mixture with about 5% nitrogen will simultaneously reduce the hydrogen content and the carbon-monoxide impurity level to bring the mixture within the area bounded by the graph B.

Moreover, to produce a gas mixture of 98% hydrogen, 1.8% nitrogen and 0.2% carbon monoxide, by a rectification with reflux condensation in accordance with the present invention at a pressure of, say, 16 atm. and a temperature of 66° K., nitrogen must be added to the crude gas when its carbon-monoxide content, in proportion to its hydrogen content, exceeds the following levels:

| Volume percent $H_2$ | Volume percent CO |
|---|---|
| 70 | 25.6 |
| 80 | 14.8 |
| 85 | 9.75 |
| 90 | 5.5 |
| 95 | 1.45 |
| (98) | (0.2) |

The limiting levels of the carbon-monoxide content given above are dependent partly on the imbalance in equilibrium state between liquid and gas which is to be permitted during rectification and partly on the pressure under which the rectification is performed. So the given limits have an inaccuracy of 10–20%. From the table it can be seen that the permissible level of the carbon-monoxide content is the higher, the lower the content of hydrogen in the crude gas.

Figure 2:
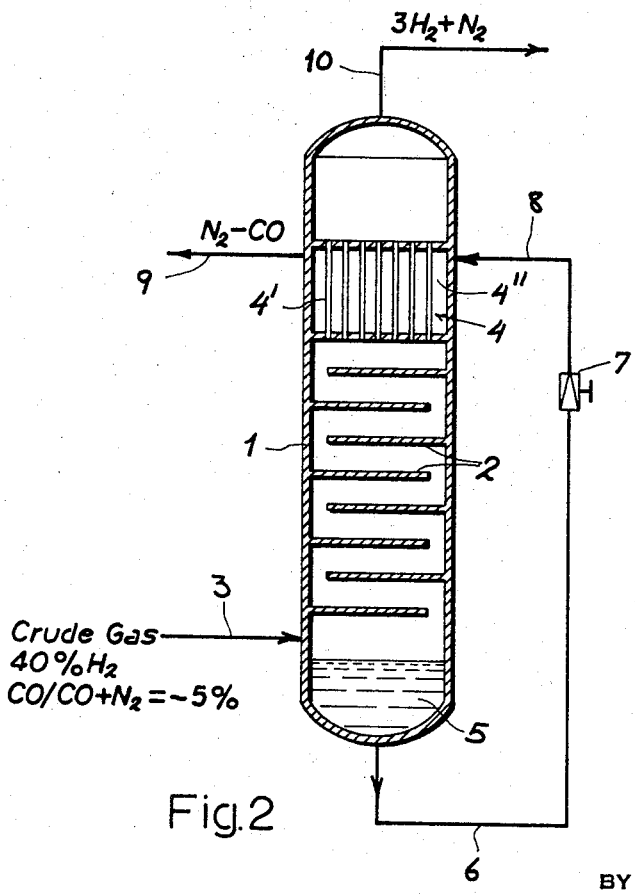
FIG. 2 is a diagrammatic elevational view of a rectification tower according to the present invention.

In FIG. 2, there is shown a rectification and washing tower 1 which, in practice, will have between substantially 40 and 80 stages 2, e.g. apertured plates or stages staggered with respect to one another, forming a tortuous path of the crude gas entering at an inlet 3 above the sump 5. The latter serves to collect the condensate which is enriched in carbon monoxide as it washes this compound from the rising current of crude gas. Above the last washing stages 2 there is disposed a heat exchanger 4 of the nested-tube type, the tubes 4' communicating with the interior of the tower 1 and serving to conduct crude gas therethrough. The chamber 4" surrounding the bundle of tubes 4' is supplied with a cooling fluid via a line 8 and an expansion valve 7 connecting the line 8 with a duct 6 leading from the sump 5. The cooling fluid is discharged from the heat exchanger 4 at the head of the tower 1 via a line 9 while the purified gas is led away from the tower via the line 10. The operation of this embodiment of an apparatus for carrying out the invention will be described with reference to Example VI, infra.

Figure 3:
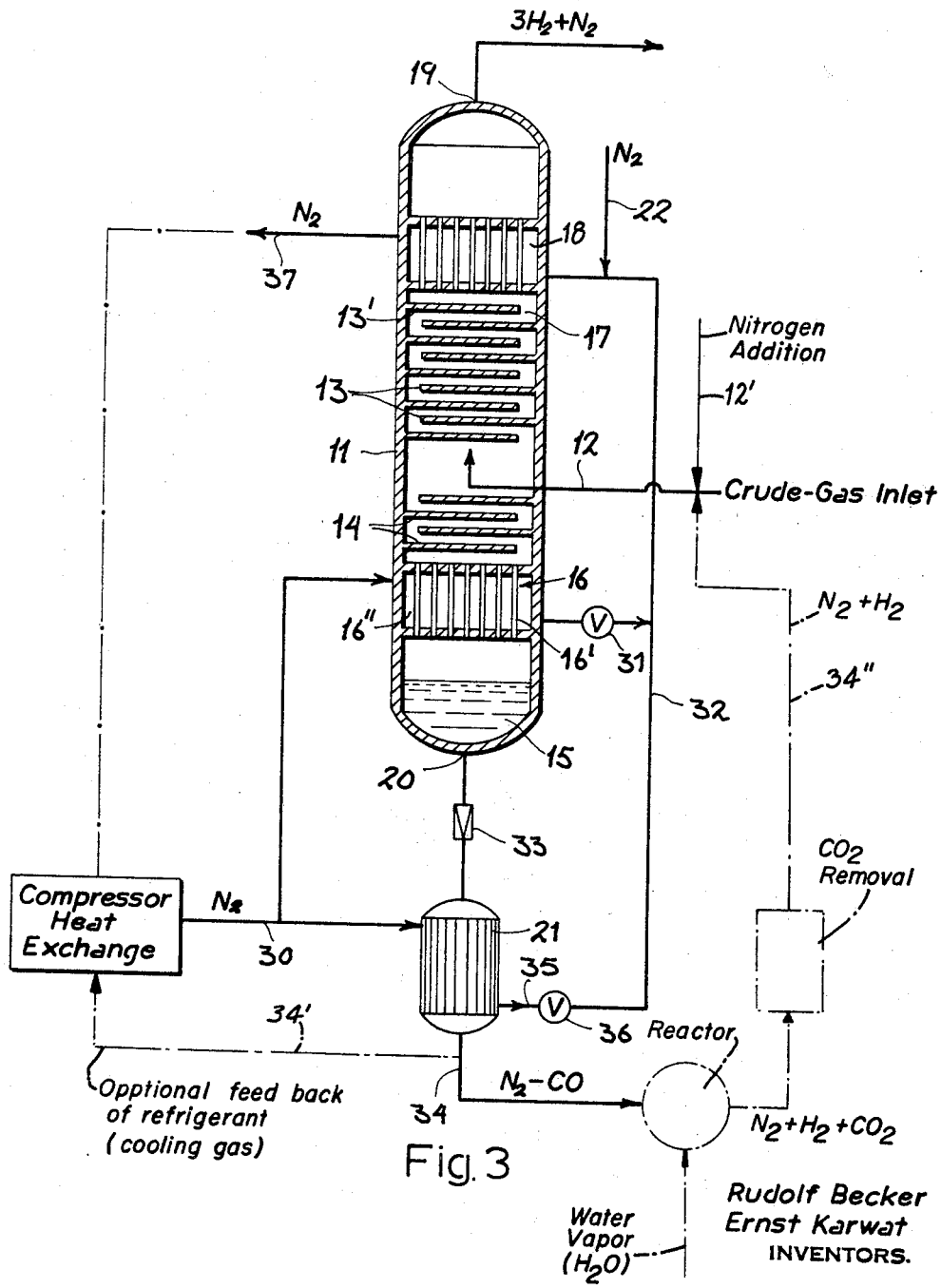
FIG. 3 is a view similar to FIG. 2 showing another embodiment.

In FIG. 3 there is shown another installation for the recovery of nitrogen and hydrogen and mixtures with reduced concentrations of carbon monoxide. The rectification tower 11 is provided, above the crude-gas inlet 12, with a large number (e.g. 80) of rectification stages 13 in the form of staggered plates forming a tortuous path along which the crude gas must ascend. Below the inlet 12, a lesser number (e.g. 5–7) of rectification stages or plates 14 are provided. Below this latter stack of plates, the sump 15 collects the condensate which passes through the tubes of a nested-tube heat exchanger or vaporizer 16.

A reflux cooler or condenser 18, also on the nested-tube pipe, is disposed above the stack of plates 13 at the head of the tower 17.

A conduit 30 supplies relatively pure nitrogen to the chamber 16″ surrounding the tube 16′ of the vaporizing heat exchanger 16; a valve 31 adjusts the rate of flow from this vaporizer to a line 32. Another vaporizer 21 communicates via a line 20 and an expansion nozzle 33 with the sump 15 and is provided with an outlet 34 and a duct 35 which, together with a valve 36, connects the vaporizer with line 12′. Line 12′ supplies nitrogen as required to the crude-gas inlet 12. A nitrogen line 22 also communicates with line 32 which leads to the nested-tube heat exchanger 18 whose outlet 37 carries nitrogen away from the system. A line 19 conducts the purified gas from the head 17 of the tower subsequent to the partial condensation which is carried out immediately after the gas passes through the last rectifying stage 13′. The operation of the system of FIG. 3 is described in greater detail with respect to Example VII infra. When a mixture of nitrogen and carbon monoxide serves as a coolant, the line 34′ is provided.

Figure 4:
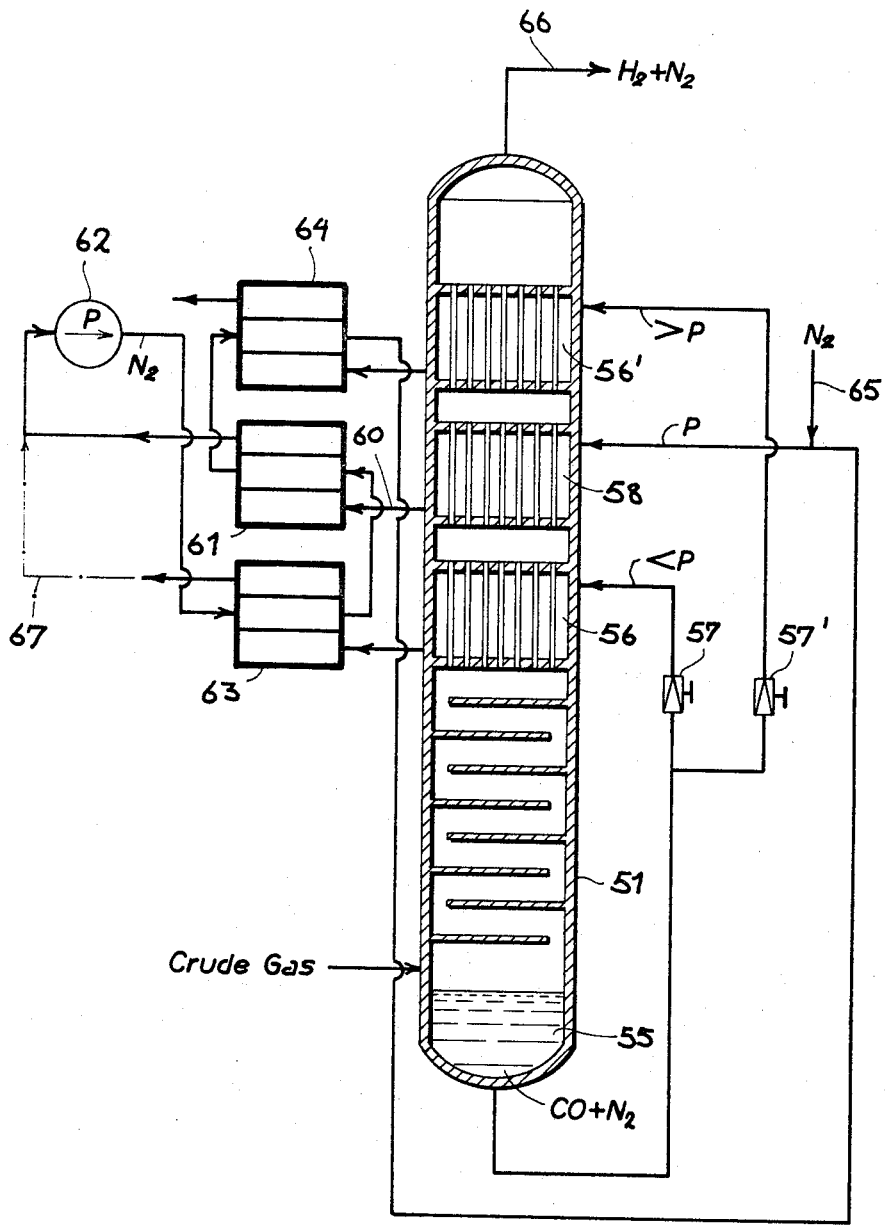
FIG. 4 is still another diagrammatic view of a rectification system according to the invention.

According to a modification of the present invention, as illustrated in FIG. 4, the vaporizer 21 of FIG. 3 can be dispensed with and replaced by one or more vaporizer-condensers at the head of the tower 51. Thus the head of the tower can be provided with the nitrogen-fed tube-bundle condenser 58 below which is disposed a vaporizer-condenser 56 in which the carbon monoxide/nitrogen mixture from the sump 55 is vaporized after passing through a pressure-adjusting expansion valve 57. The vaporizer-condenser 56 should, for the reason to become apparent hereinafter, be maintained at a pressure greater than that at which nitrogen passes through the condenser 58. Only a portion of the carbon monoxide/nitrogen mixture need be diverted to the condenser 56 since the remainder can be fed to another vaporizer-condenser 56′ above condenser 58 and operated at a pressure lower than that of the condenser 58. Either one of the vaporizer condensers 56, 56′ can be dispensed with merely by closing the respective expansion valve 57 or 57′, in which case all of the sump liquid can be fed into the remaining condenser. It is also possible to expand the sump mixture into the vaporizer condenser 56 at the same pressure P as that of the nitrogen in condenser 58. Under these circumstances, the sump-liquid vaporizer is and should be disposed below the nitrogen vaporizer because the sump liquid, consisting of a mixture of carbon monoxide and nitrogen, has a boiling temperature in excess of that of nitrogen at the same pressure. The nitrogen led off from condenser 58 via line 60 passes to a heat exchanger 61 where it serves to cool nitrogen compressed by a pump or compressor 62 as described with reference to FIG. 3, the compressed nitrogen being subjected first to cooling at a heat exchanger 63 in which the cooling fluid is the expanded gas from condenser 56 and finally the heat exchanger 64 in which the cooling fluid is the expanded gas from condenser 56′. The cooled nitrogen can then be supplied to the condenser 58 with further liquid nitrogen being added at 65 to compensate for the gain of heat in the system. The hydrogen/nitrogen mixture thus purified is removed at 66. It is also possible to dispense with the condenser 58 and employ only one or both of the condensers 56, 56′ in which the sump liquid is expanded. A portion of the vaporized carbon monoxide/nitrogen mixture from the condensers 56, 56′ can then be passed into the compressor 62 (as represented by dot-dash line 67) and then subjected to heat exchange in one or both of the units 63, 64, to be heated thereby. The heated product can then be recycled to a vaporizer similar to that shown at 16 and disposed at the sump of the tower. The fluid used for this purpose can then be recombined with the sump liquid fed to the vaporizer condensers at 56, 56′.

It will be apparent that the composition of the sump liquid and the liquid in the vaporizer/condenser circulation system is determined only by the quantity of the synthesis gas produced in the system and is not related either to the composition of the crude-hydrogen gas or its carbon monoxide content. The nitrogen concentration in the crude gas can be 4 or 5 times that required in the synthesis gas. Excess nitrogen can be removed by a preliminary condensation in advance of introduction of the crude gas into the rectification tower.

EXAMPLE I 1020 m.$^3$ at standard temperature and pressure (S.T.P.) of a crude hydrogen-containing gas consisting of about 88.2% by volume of hydrogen and 5.9% by volume each of carbon monoxide and nitrogen is passed in countercurrent to the rectification products of a previous separation and thereby cooled at a pressure of 20 atmospheres to a temperature of substantially 85° K. Thereafter, the gas stream is fed into the lower end of a rectification tower having 11 rectification stages (in the form of apertured plates) thereabove. At the head of the tower a condenser for the return flow (reflux) liquid is provided, the condenser being a nested-tube heat exchanger. The chamber surrounding the tube bundle is filled with liquid nitrogen while the hydrogen-containing gas passes through the tubes of the bundle. The liquid nitrogen surrounding the tubes boil at a pressure of about 0.15 atmosphere at a temperature of 64° K. and such volatilization effects a sharp cooling of the gases as they leave the rectification tower through the tube bundle to precipitate nitrogen therefrom. The gas stream emerging from the tower, upon analysis is found to contain 898 m.$^3$ (S.T.P.) of hydrogen, 16.5 m.$^3$ (S.T.P.) of nitrogen and 1.83 m.$^3$ (S.T.P.) of carbon monoxide. The condensate developed at the head of the tower in the heat-exchanger tube bundle trickles past the plates of the 11 rectification stages and is recovered at the foot of the tower as a liquid mixture of 43.5 m.$^3$ (S.T.P.) nitrogen, 58.3 m.$^3$ (S.T.P.) carbon monoxide, and 2 m.$^3$ (S.T.P.) of hydrogen. This liquid is expanded upon removal from the rectification tower which is maintained at the aforementioned pressure of 20 atmospheres to a pressure of 1 atmosphere (atmospheric pressure) at which it is converted to a gas and cooled; the cold gas is passed countercurrent to a gaseous nitrogen stream at a pressure of 2 atmospheres and thereby liquifies the latter, the liquid nitrogen being then led to the condenser at the head of the rectification tower wherein it is vaporized at the reduced pressure of 0.15 atmosphere, as previously mentioned. The liquid fraction, precipitated and separated from the hydrogen-containing gas mixture, is thus found to contain 86.6 m.$^3$ (S.T.P.) of nitrogen and 15.3 m.$^3$ (S.T.P.) of carbon monoxide and forms the return flow or reflux for the rectification process. This liquid can thus be used to cool additional quantities of the crude gas prior to its introduction into the rectification tower. To cover the loss of cold (i.e. the net thermal gain of the effluent gases over the thermal content of the input gases and liquids), an additional quantity of liquid nitrogen, separated by rectification of one of the nitrogen/carbon monoxide mixtures or generated in the manner described (e.g. by reformation of CO with steam) is fed to the condenser at the head of the rectification tower for vaporization therein.

EXAMPLE II

A crude hydrogen-containing gas (90% hydrogen, 6% carbon monoxide and 4% nitrogen) is fed in countercurrent to the precipitate formed earlier by a similar operation at a pressure of 20 atmospheres. The crude-gas mixture is thereby cooled to a temperature of 83° K. and fed into the rectification tower previously described. To the condenser at the head of the tower, liquid nitrogen is supplied at a temperature of 64° K. and volatilized. The condensate collected at the foot of the tower rinses the gas mixture rising therethrough and is subsequently employed to cool the nitrogen fed to the condenser and, when the heat balance is appropriate, also serves to cool the crude gas added to the rectification tower at its base. The purified gas emerging from the condenser at the head of the tower thereby consists of 898 m.$^3$ (S.T.P.) hydrogen, 5.0 m.$^3$ (S.T.P.) carbon monoxide and 13 m.$^3$ (S.T.P.) nitrogen. The carbon monoxide level is thus higher than that desired (i.e. about 0.55%).

EXAMPLE III

According to the present invention, the above gas mixture of 900 m.$^3$ (S.T.P.) of hydrogen, 60 m.$^3$ (S.T.P.) of carbon monoxide and 40 m.$^3$ (S.T.P.) of nitrogen has admixed therewith 20 m.$^3$ (S.T.P.) of air containing 4.2 m.$^3$ (S.T.P.) oxygen and 15.8 m.$^3$ (S.T.P.) of nitrogen. The resulting mixture thus has a composition of 88.1% hydrogen, 5.45% nitrogen, 5.89% carbon monoxide and 0.4% oxygen, all percents by volume. This gas mixture is subjected to partial condensation and reflux rectification in the apparatus and in the manner described in Example I so that, at the head of the rectification tower, a gas stream consisting of 898 m.$^3$ (S.T.P.) of hydrogen, 16.5 m.$^3$ (S.T.P.) of nitrogen and 1.8 m.$^3$ (S.T.P.) of carbon monoxide is recovered. At the sump of the tower, below the entry zone of the crude gases, 103.7 m.$^3$ (S.T.P.) of a liquid mixture is accumulated, this mixture containing 58.2 m.$^3$ (S.T.P.) carbon monoxide, 39.3 m.$^3$ (S.T.P.) nitrogen and 4.2 m.$^3$ (S.T.P.) of oxygen and 2 m.$^3$ (S.T.P.) of hydrogen. The oxygen content of this latter mixture, which is employed for the preliminary cooling of a crude gas mixture and/or for the cooling of the nitrogen stream fed to the condenser or even as the condenser fluid itself, lies below the detonation limit which, for the gas described, is about 5.4% oxygen.

EXAMPLE IV

Whereas the gas mixture subjected to rectification in the system of Example II had a carbon-monoxide impurity ratio of about 60% and thus outside the limits within which the present invention is operable, as discussed with reference to FIG. 1, and the carbon-monoxide impurity level was substantially reduced by the addition of nitrogen (in the form of air) in Example III, it is also possible to recover a practically carbon-monoxide-free hydrogen-containing gas from the starting material of Example II. Thus, the crude gas of that example, consisting of 900 m.$^3$ (S.T.P.) of hydrogen, 60 m.$^3$ (S.T.P.) of carbon monoxide and 40 m.$^3$ (S.T.P.) nitrogen can yield a product containing 98% hydrogen and no more than 0.2% carbon monoxide without the need for additional nitrogen. The crude gas mixture is introduced to a rectification tower at a pressure of 20 atmospheres and a temperature of 83° K. after cooling, as described earlier. The rectification tower, as described with reference to FIG. 3, for example, is produced with vertically spaced rectification stages 13 in the form of perforated plates defining a tortuous path for the rising gases. Eleven such plates or stages can be provided, as described in connection with Example II. Below the inlet 12 for the crude gas, however, additional rectification stages or plates 14 are provided below which is disposed a condenser 16, disposed just above the sump 15. The condenser 16 at the sump is of the nested-tube type and is formed with a chamber surrounding the tube bundle in which nitrogen is liquefied. Thereby a part of the sump liquid is evaporated and the vapors commingle with the crude gas entering the rectification column, while the liquefied nitrogen is expanded and introduced into the condenser at the head of the column. Together with a further amount of liquid nitrogen it is evaporated there at a pressure of 0.15 atm. The condenser at the head of the tower is operated as described with regard to Example I. The evaporation of liquid nitrogen in the condenser at the head of the column results in cooling and partially condensing the vapors rising in the column. The condensate thus formed is used as reflux liquid. This processing yields a head product consisting of 900 m.$^3$ (S.T.P.) hydrogen, 16.65 m.$^3$ (S.T.P.) nitrogen, and 1.85 m.$^3$ (S.T.P.) carbon monoxide and 81.5 m.$^3$ (S.T.P.) sump liquid consisting of 58.15 m.$^3$ (S.T.P.) carbon monoxide and 23.35 m.$^3$ (S.T.P.) nitrogen. The sump liquid is removed, expanded to a pressure of 1.2 atmospheres, and evaporated, thereby cooling nitrogen to produce a substantially equivalent quantity of liquid nitrogen which, in the manner described, is passed into the condenser and then evaporated.

EXAMPLE V

A mixture of methane-containing gas, air and steam is catalytically reformed at a pressure of 9 atmospheres and a temperature of about 900° C. by partial combustion. The carbon monoxide formed in this manner is reacted with water vapor to yield carbon dioxide and hydrogen. Carbon dioxide is removed together with methane in a conventional manner and the product is then fluid to have a composition of 54.7% hydrogen (10,000 m.$^3$ S.T.P.), 42.1% nitrogen (7,670 m.$^3$ S.T.P.) and 3.2% carbon monoxide (580 m.$^3$ S.T.P.). This gas is fed into a rectification tower of the type shown in FIG. 2 at the temperature and pressure employed in the system of Example I. The gas recovered at the head consists of 75% hydrogen (10,000 m.$^3$ S.T.P.), 25% nitrogen (3,330 m.$^3$ S.T.P.), and $5\times10^{-4}$% carbon monoxide ($6.7\times10^{-3}$ m.$^3$ S.T.P.). The sump liquid consists of 88.2% nitrogen (4,340 m.$^3$ S.T.P.) and 11.8% carbon monoxide (580 m.$^3$ S.T.P.).

EXAMPLE VI

A crude gas is introduced at the inlet 3 at a rate of about 10,000 m.$^3$ (S.T.P.)/hr. and a pressure of approximately 6 atmospheres, gauge (atm. g.). The crude gas had a composition of substantially 40% hydrogen, 56% nitrogen, 0.8% argon, 0.2% oxygen and 3% carbon monoxide. This gas mixture rises along a tortuous path from stage to stage in countercurrent to the downward trickle of a reflux liquid separated from the gas at a condenser 4 by partial condensation. At a sump 5 of the rectification tower 1 approximately 4,700 m.$^3$ (S.T.P.)/hr. of a liquid mixture of substantially 25 m.$^3$ (S.T.P.)/hr. hydrogen, 4,275 m.$^3$ (S.T.P.)/hr. nitrogen, 80 m.$^3$ (S.T.P.)/hr. argon, 20 m.$^3$ (S.T.P.)/hr. oxygen and 300 m.$^3$ (S.T.P.)/hr. of carbon monoxide, is collected. This mixture is led off via a line 6 at the aforementioned pressure of 6 atm. g. and expanded at the expansion valve 7 to a pressure of 0.2 atm. g. with consequent cooling, the cold vapors being directed via duct 8 to the chamber 4" of the condenser 4 at the head of the tower 1. The gas, from which some of carbon monoxide has been removed as it travels upward in the tower, is subjected to a partial condensation at the temperature of the vaporized reflux and sump mixture which is removed as a gas at line 9, the gas consisting predominantly of nitrogen and carbon monoxide as indicated earlier. The vapor, containing about 90% nitrogen, can be employed for the initial cooling of the crude gas or can be further purified to yield nitrogen adapted to be admixed with the crude gas should the latter be of a composition falling outside the curves of FIG. 1. In the present case, however, with a hydrogen content of 40% and a carbon-monoxide impurity ratio of approximately 5%, the crude gas falls below the graph A of FIG. 1 and thus does not require the addition of nitrogen and is capable of yielding substantially a 3:1 mixture of hydrogen and nitrogen. Thus, at the head of the tower 1, the pipe 10 conveys at a pressure of 6 atm. g. and a temperature of about 80° K. a carbon monoxide-free, nitrogen-hydrogen mixture at a rate of approximately 3,925 m.$^3$ (S.T.P.)/hr. hydrogen and 1,325 m.$^3$ (S.T.P.)/hr. nitrogen away from the installation 1.

EXAMPLE VII

Using the system shown in FIG. 3, a crude gas is subjected to rectification at a pressure of 8.6 atm. and a temperature of about 90.5° K. Under these conditions the gas is introduced at the inlet 12 to the rectification tower and flows upwardly together with 5,600 m.³ (S.T.P.) of the heat exchanger 16. Thus the heat exchanger and the tne heat exchanger 16. Thus the heat exchanger and the condenser operate as a reflux heating source and condenser for the repeated circulation of the liquid. The rising gas mixture flows countercurrent to 10,150 m.³ (S.T.P.) of the reflux liquid consisting predominantly of nitrogen and carbon monoxide which exchanges nitrogen with the rising stream while removing carbon monoxide therefrom. In the condenser 18 about 10,150 m.³ (S.T.P.) of nitrogen are precipitated as the washing liquid derived from the gas stream while the 3:1 mixture of hydrogen and nitrogen are removed at 19. The recovered gas contains 10,000 m.³ (S.T.P.) hydrogen, 3,330 m.³ (S.T.P.) nitrogen and $6.5 \times 10^{-3}$ m.³ (S.T.P.) carbon monoxide, and is at a pressure of about 8 atm. As the reflux liquid descends, it increases in carbon monoxide content since at each station or stage of the tower the concentration of carbon monoxide in the carbon monoxide nitrogen solution is less than the partial pressure of carbon monoxide in the gas phase. The temperature of the liquid rises equally below the inlet zone 12 from 90.5° K. to 98° K. because a portion of the vapor above the vaporizer 16 condenses in the reflux liquid as the gas moves upward. Below the vaporizer 16, the carbon-monoxide content is found to be about 11.8%. This liquid is removed from the rectification tower at 20 and expanded via nozzle 33 to a pressure of 1.2 atm. and serves to cool compressed nitrogen fed from line 30 through the heat exchanger 21. The compressed nitrogen is initially at a pressure of 1.2 atm. This nitrogen passes via line 35 and valve 36 to line 32. Duct 30 can be supplied with compressed nitrogen from a compressor and heat-exchanger arrangement wherein the compressed nitrogen is brought to a pressure of about 11 atm. and passed in heat-exchanging relationship with cold nitrogen at a pressure of 1:1.2 atm. as recovered, for example, at line 37 from the condenser 18. Two-thirds of the compressed nitrogen by value is supplied to the vaporizer 16 while the remainder feeds the vaporizer 21. The nitrogen collected from these vaporizers and passing through line 32, is supplied to the condenser 18 and vaporized thereat with expansion to a pressure of about 1.2 atm. The net heat absorption of the system, as measured by the cooling capacity lost at outlets 19 and 34, for example, and that radiating from the system or otherwise lost by virtue of heat exchange, can be compensated by adding corresponding quantities of liquid nitrogen to the system at 22. The liquefaction of this quantity of nitrogen can be carried out by conventional techniques involving alternate compression and expansion and is a procedure well known in the art, requiring no additional description. A portion of the sump liquid removed at 34 can be diverted to eliminate carbon monoxide and produce nitrogen which can be added to the crude gas as previously described. About 5,600 m.³ of nitrogen can be recirculated in this manner.

We claim:

1. A method of obtaining hydrogen-nitrogen gas mixtures with reduced carbon-monoxide content from a crude gas containing hydrogen, nitrogen and carbon monoxide, comprising the steps of:

(a) subjecting said crude gas at an elevated pressure to a reduced temperature sufficient to partially condense therefrom a condensate rich in molecular nitrogen;

(b) washing subsequent quantities of said crude gas with a condensate from step (a) to extract carbon monoxide from said subsequent quantities of crude gas;

(c) thereafter subjecting said subsequent quantities of said crude gas from which at least part of the carbon monoxide has been removed by washing with said condensate to said reduced temperature and at said elevated pressure of step (a) to precipitate further quantities of said condensate therefrom and yield a gas having a low carbon-monoxide concentration, said crude gas being washed in step (b) with the condensate from step (a) while ascending a multi-stage rectification tower, the precipitation of said condensate being carried out immediately above the uppermost stage of said tower with said condensate passing downwardly countercurrent to the crude-gas stream rising therein; and (d) collecting at the base of said tower a liquid constituted by said condensate enriched in carbon monoxide and consisting predominantly of carbon monoxide and nitrogen, the composition of said crude gas prior to washing in step (b) lying under the area defined by the curve A of the graph of FIG. 1, the carbon-monoxide impurity ratio of said graph of FIG. 1 being the volume proportion of carbon monoxide to the sum of carbon monoxide and nitrogen volumes in said crude gas.

2. A method of obtaining hydrogen-nitrogen gas mixtures with reduced carbon-monoxide content from a crude gas containing hydrogen, nitrogen and carbon monoxide, comprising the steps of:

(a) subjecting said crude gas at an elevated pressure to a reduced temperature sufficient to partially condense therefrom a condensate rich in molecular nitrogen;

(b) washing subsequent quantities of said crude gas with the condensate from step (a) to extract carbon monoxide from said subsequent quantities of crude gas;

(c) thereafter subjecting said subsequent quantities of said crude gas from which at least part of the carbon monoxide has been removed by washing with said condensate to said reduced temperature and at said elevated to pressure of step (a) to precipitate further quantities of said condensate therefrom and yield a gas having a low carbon-monoxide concentration, said crude gas being washed in step (b) with the condensate from step (a) while ascending a multi-stage rectification tower, the precipitation of said condensate being carried out immediately above the uppermost stage of said tower with said condensate passing downwardly countercurrent to the crude-gas stream rising therein;

(d) collecting at the base of said tower a liquid constituted by said condensate enriched in carbon monoxide and consisting predominantly of carbon monoxide and nitrogen, the condensate being formed in steps (a) and (c) by expanding a nitrogen refrigerant from a liquid state to a gas in heat-exchanging relationship with the crude gas washed with said condensate in step (b);

(e) cooling the nitrogen passed in heat-exchanging relationship with said crude gas by expanding said carbon-monoxide and nitrogen liquid and conveying it in heat-exchanging relationship with the nitrogen prior to its use in steps (a) and (c), said crude gas having a hydrogen content and a carbon-monoxide impurity ratio prior to washing with said condensate within the area under the curve B and above curve A of the graph of FIG. 1, said carbon-monoxide impurity ratio being the volume proportion of carbon monoxide to the sum of carbon monoxide and nitrogen volumes in said crude gas; and (f) selectively adding nitrogen to said crude gas prior to said washing of said crude gas with said condensate to decrease the carbon-monoxide impurity ratio therein selectively to a level beneath the curve A of FIG. 1 to produce an ammonia synthesis gas.

3. The method defined in claim 2 wherein said nitrogen added to said crude gas in step (f) is supplied as the predominant component of a gas mixture.

4. The method defined in claim 2, further comprising the steps of:

(g) vaporizing said liquid consisting predominantly of carbon monoxide and nitrogen;

(h) reacting the carbon monoxide gas produced by vaporization of said liquid in step (g) with water vapor to produce a further gas stream containing hydrogen, nitrogen and carbon dioxide;

(i) removing said carbon dioxide from said further gas stream; and (j) adding said further gas stream freed from carbon dioxide to said crude gas prior to its treatment in step (b).

5. The method defined in claim 2, further comprising the step (g) of vaporizing part of the condensate as it descends in said tower and prior to collecting said condensate, thereby producing a stripping vapor and admixing same with the crude gas subjected to washing in step (b).

6. A method of obtaining hydrogen-nitrogen gas mixtures with reduced carbon-monoxide content from a crude gas containing hydrogen, nitrogen and carbon monoxide, comprising the steps of:

(a) subjecting said crude gas at an elevated pressure to a reduced temperature sufficient to partially condense therefrom a condensate rich in molecular nitrogen;

(b) washing subsequent quantities of said crude gas with the condensate from step (a) to extract carbon monoxide from said subsequent quantities of crude gas;

(c) thereafter subjecting said subsequent quantities of said crude gas from which at least part of the carbon monoxide has been removed by washing with said condensate to said reduced temperature and at said elevated pressure of step (a) to precipitate further quantities of said condensate therefrom and yield a gas having a low carbon-monoxide concentration, said crude gas being washed in step (b) with the condensate from step (a) while ascending a multistage rectification tower, the precipitation of said condensate being carried out immediately above the uppermost stage of said tower with said condensate passing downwardly countercurrent to the crude-gas stream rising therein;

(d) collecting at the base of said tower a liquid constituted by said condensate enriched in carbon monoxide and consisting predominantly of carbon monoxide and nitrogen, the condensate being formed in steps (a) and (c) by expanding a nitrogen refrigerant from a liquid state to a gas in heat exchanging relationship with the crude gas washed with said condensate in step (b);

(e) cooling the nitrogen passed in heat-exchanging relationship with said crude gas by expanding said carbon monoxide and nitrogen liquid and conveying it in heat-exchanging relationship with the nitrogen prior to its use in steps (a) and (c), said crude gas having a hydrogen content and a carbon-monoxide impurity ratio prior to washing with said condensate within the area above the curve B of the graph of FIG. 1, said carbon monoxide impurity ratio being the volume proportion of carbon monoxide to the sum of carbon monoxide and nitrogen volumes in said crude gas; and (f) selectively adding nitrogen to said crude gas prior to said washing of said crude gas with said condensate to decrease the carbon-monoxide impurity ratio therein selectively to a level above the curve A but beneath the curve B of FIG. 1 to produce a gas containing at least about 90% hydrogen.

7. A method of obtaining hydrogen-nitrogen gas mixtures with reduced carbon-monoxide content from a crude gas containing hydrogen, nitrogen and carbon monoxide, comprising the steps of:

(a) subjecting said crude gas at an elevated pressure to a reduced temperature sufficient to partially condense therefrom a condensate rich in molecular nitrogen;

(b) washing subsequent quantities of said crude gas with the condensate from step (a) to extract carbon monoxide from said subsequent quantities of crude gas;

(c) thereafter subjecting said subsequent quantities of said crude gas from which at least part of the carbon monoxide has been removed by washing with said condensate to said reduced temperature and at said elevated pressure of step (a) to precipitate further quantities of said condensate therefrom and yield a gas having a low carbon-monoxide concentration, said crude gas being washed in step (b) with the condensate from step (a) while ascending a multistage rectification tower, the precipitation of said condensate being carried out immediately above the uppermost stage of said tower with said condensate passing downwardly countercurrent to the crude-gas stream rising therein;

(d) collecting at the base of said tower a liquid constituted by said condensate enriched in carbon monoxide and consisting predominantly of carbon monoxide and nitrogen; and (e) vaporizing part of the condensate as it descends in said tower and prior to collecting said condensate thereby producing a stripping vapor and admixing same with the crude gas subjected to washing in step (b); and said part of condensate being vaporized in step (e) by passing it in out-of-contact heat-exchanging relationship, at a location above the liquid collected in step (d), with a compressed gas which is cooled thereby and serves to bring said crude gas to said reduced temperature in step (c).

8. The method defined in claim 7 wherein the crude gas is brought to said reduced temperature in step (c) by expansion of a cooling gas liquefied in step (e) while vaporizing said condensate, said method further comprising the step (f) of compressing said cooling gas subsequent to its heat exchange with said crude gas in step (c) and feeding the cooling gas thus compressed in a warm state into heat-exchanging relationship with said condensate in step (e).

9. The method defined in claim 8 wherein said cooling gas is nitrogen.

References Cited

UNITED STATES PATENTS

| | | | |
|---|---|---|---|
| 1,678,518 | 7/1928 | Liljenroth. | |
| 2,122,238 | 6/1938 | Pollitzer | 62—31 |
| 2,591,658 | 4/1952 | Haringhuizen | 62—23 |
| 2,610,106 | 9/1952 | Gray | 23—199 |
| 2,692,484 | 10/1954 | Etienne | 62—23 X |
| 2,729,954 | 1/1956 | Etienne | 62—28 |
| 2,820,769 | 1/1958 | Haringhuizen. | |
| 3,027,237 | 3/1962 | McMullan | 23—199 |

NORMAN YUDKOFF, *Primary Examiner.*

V. W. PRETKA, *Assistant Examiner.*